US012553579B2

(12) United States Patent
He et al.

(10) Patent No.: US 12,553,579 B2
(45) Date of Patent: Feb. 17, 2026

(54) DEVICE WITH A BUILT IN ANTENNA

(71) Applicant: SIGNIFY HOLDING B.V., Eindhoven (NL)

(72) Inventors: Yue He, Shanghai (CN); Chaonan Tian, Shanghai (CN); Ruipan Zhang, Shanghai (CN); Yongjun Yang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 46 days.

(21) Appl. No.: 18/726,484

(22) PCT Filed: Dec. 13, 2022

(86) PCT No.: PCT/EP2022/085522
§ 371 (c)(1),
(2) Date: Jul. 3, 2024

(87) PCT Pub. No.: WO2023/131477
PCT Pub. Date: Jul. 13, 2023

(65) Prior Publication Data

US 2025/0084969 A1 Mar. 13, 2025

(30) Foreign Application Priority Data

Feb. 25, 2022 (EP) .................................... 22158816

(51) Int. Cl.
*F21K 9/238* (2016.01)
*F21V 23/00* (2015.01)
(Continued)

(52) U.S. Cl.
CPC ............ *F21K 9/238* (2016.08); *F21V 23/006* (2013.01); *H01Q 1/2283* (2013.01); *H01Q 21/062* (2013.01)

(58) Field of Classification Search
CPC ...... F21K 9/278; F21K 9/238; F21V 23/0435; F21V 23/045; F21V 23/00
See application file for complete search history.

(56) References Cited

U.S. PATENT DOCUMENTS 9,488,352 B2 * 11/2016 Hussey .................. F21K 9/238
9,685,703 B2 6/2017 Kao et al.
(Continued)

FOREIGN PATENT DOCUMENTS

EP 2962359 A1 1/2016
EP 3772874 A1 2/2021
GB 2498431 A 7/2013

*Primary Examiner* — William J Carter

(57) ABSTRACT

An electronic device comprises a housing having an internal surface, a circuit board within the housing, an RF circuit mounted on the circuit board and an antenna formed on the housing. A positioning member is formed on the internal surface of the housing, and it engages and positions the circuit board. A first RF coupling portion is formed on the positioning member, and electrically connects to the antenna and a second RF coupling 5 portion is formed on the circuit board and electrically connects to the RF circuit. When the circuit board is fitted to the positioning member, the second RF coupling portion is aligned with, and RF coupled to, the first RF coupling portion so as to provide a RF coupling between the antenna and the RF circuit, characterized in that said first RF coupling portion is adapted to provide the RF coupling as the feed of the antenna structure.

16 Claims, 8 Drawing Sheets

(51) Int. Cl.
*H01Q 1/22* (2006.01)
*H01Q 21/06* (2006.01)

(56) References Cited

U.S. PATENT DOCUMENTS

| | | | | |
|---|---|---|---|---|
| 9,726,360 | B1 * | 8/2017 | Alexander | H01Q 19/185 |
| 9,755,307 | B2 | 9/2017 | Chi et al. | |
| 9,784,417 | B1 * | 10/2017 | Springer | F21K 9/232 |
| 2007/0007898 | A1 * | 1/2007 | Bruning | H05B 45/40 315/34 |
| 2012/0069545 | A1 * | 3/2012 | Choi | F21V 3/00 362/249.02 |
| 2012/0274208 | A1 * | 11/2012 | Chen | H05B 47/19 315/34 |
| 2013/0285544 | A1 * | 10/2013 | Molezion | H01Q 1/44 315/34 |
| 2014/0021862 | A1 * | 1/2014 | Chung | F21V 29/77 315/112 |
| 2014/0273892 | A1 * | 9/2014 | Nourbakhsh | H04B 1/3827 455/90.3 |
| 2015/0103515 | A1 * | 4/2015 | Bosua | F21V 29/83 362/373 |
| 2017/0130907 | A1 * | 5/2017 | Cho | F21V 5/04 |
| 2017/0141462 | A1 | 5/2017 | Lin et al. | |
| 2018/0294829 | A1 * | 10/2018 | Nourbakhsh | H04B 1/3827 |
| 2021/0105566 | A1 | 4/2021 | Kirchhoff | |
| 2022/0022298 | A1 * | 1/2022 | Zhao | H01Q 1/44 |
| 2022/0042655 | A1 * | 2/2022 | Lin | F21K 9/238 |

* cited by examiner

DEVICE WITH A BUILT IN ANTENNA

CROSS-REFERENCE TO PRIOR APPLICATIONS

This application is the U.S. National Phase application under 35 U.S.C. § 371 of International Application No. PCT/EP2022/085522, filed on Dec. 13, 2022, which claims the benefit of European Patent Application No. 22158816.3, filed on Feb. 25, 2022 and International Application No. PCT/CN2022/070102, filed on Jan. 4, 2022. These applications are hereby incorporated by reference herein.

FIELD OF THE INVENTION

The invention relates to a device which incorporates an antenna. The invention is for example of interest for lighting device such as LED lamps.

BACKGROUND OF THE INVENTION

Wireless control of devices, by providing a built-in antenna, is becoming increasingly popular.

One example is light sources both for indoor and outdoor applications. Intelligent lighting has become widespread, and RF communication is a powerful technology used in this remote management of lamps, in particular for domestic and office environments.

By using wireless control, instead of controlling the power supply to the lamp, the light source can be controlled directly by sending an RF control signal to the lighting device.

LED bulbs are widely used, but how to make these bulbs wirelessly connected is a challenge. Most state-of-art wireless bulbs use off-the-shelf RF modules offered by RF companies, wherein the RF module is essentially a circuit board carrying RF circuit as well as a zig-zag RF antenna. The circuit board has an interface to an external driver circuit. For ease of connection, the RF module is put together with the driver circuit in the housing of the bulb. This configuration suffers greatly from RF fading if the bulb is put in a luminaire which has a RF blocking effect around the housing of the bulb.

Thus, it is of interest to separate the antenna from the RF circuit and driver circuit.

From the antenna perspective, a wire (e.g. loop) antenna is the most common design since it is easy to make, has a small impact on the appearance and a low cost. However, given the limited space of a bulb, it is not easy to implement the wire antenna in the bulb. In order to solve the above problem of shielding by the end cap of the bulb, the antenna ideally needs to be placed on the housing, not inside of it, for example near the light output face of the bulb.

Then one issue which arises, in particular when the antenna is formed at a separate location from a circuit board carrying the signal processing circuitry, is how to make the electrical connection between the antenna and a feed point of the circuit board. There are various known approaches.

A first approach is to solder a connection between the feed point and the antenna. This increases the manufacturing cost, for example requiring manual labor, and in tight spaces it may be difficult to implement.

A second approach is to make a spring connection or a pogo pin connection between the circuit board and the antenna. Thus also adds cost, requiring a connector on the circuit board, and a connection pad of antenna needs tin plating or copper plating. The assembly is also made more complicated. A contact pressure needs to be correctly designed, taking account of stability and aging. A metal printed antenna is easily broken, and disassembly or assembly can result in abrasion of the connection pad.

There is a need for an antenna design, and design of the feed coupling to an antenna, to address these issues.

GB2498431A discloses an antenna structure having a sleeve balun, wherein at a distal surface of the sleeve balun there are grooves to receive conductor areas of a circuit board, and the grooves and the conductor areas are connected by solder connections such that the sleeve of the antenna is connected to the shield of the transmission line. Further, the feed of the antenna in this prior art is implemented by a disc-shaped lateral laminate board part with a central slot, wherein the central slot receives a distal feed connection portion and the disc contacts feed connection nodes which connect to antenna elements.

EP3772874A1 discloses an intelligent lamp with a communication module including an antenna disposed on a light source board.

SUMMARY OF THE INVENTION

The invention is defined by the claims.

It is a concept of the invention to provide an electronic device in which a circuit board, carrying RF circuitry, is provided within a housing. The circuit board is engaged and positioned by a positioning member formed on an internal surface of the housing. A first RF coupling portion is formed on the positioning member and it connects to an antenna formed on the housing. A second RF coupling portion is formed on the circuit board and it connects to the RF circuity. An RF coupling is thus made automatically by engaging the circuit board with the positioning member. Since the positioning member is able to provide a rigid and stable fixture with the circuit board, the two RF coupling portions are also provided with a stable and consistent (i.e. good uniformity between products) RF coupling, preferably without the need for soldering or spring connections in order to make the required coupling between the RF circuitry and the antenna. Most importantly, the RF coupling formed as such serves as the feed of the antenna. Thus the reliability of the feed is improved.

According to examples in accordance with an aspect of the invention, there is provided an electronic device comprising:

- a housing having an internal surface;
- a circuit board within the housing;
- an RF circuit mounted on the circuit board;
- an antenna structure formed on the housing;
- a positioning member formed on the internal surface of the housing, and adapted to engage and position the circuit board;
- a first RF coupling portion formed on the positioning member, and electrically connected to the antenna structure; and
- a second RF coupling portion formed on the circuit board and electrically connected to the RF circuit,
- wherein, when the circuit board is engaged and positioned by the positioning member, the second RF coupling portion is aligned with, and RF coupled to, the first RF coupling portion so as to provide a RF coupling between the antenna structure and the RF circuit, characterized in that said first RF coupling portion is adapted to provide the RF coupling as the feed of the antenna structure.

The antenna structure is for example formed on the internal surface of the housing.

As mentioned above, this device has a coupling between a built-in antenna structure and a circuit board, in particular an RF circuit board, which is implemented simply by fitting the circuit board to a positioning member at an inner surface of the housing. The positioning member achieves a double function of both rigidly positioning the circuit board and providing a stable spatial positioning of the two RF coupling portions thereby the RF coupling between the circuit board and the antenna can be ensure. In particular, an RF coupling is formed, which preferably does not need an electrically conductive connection (such as a solder connection). Clearly different from the prior art wherein the feed to the antenna is implemented by a complex structure involving a disc as a connector between the board and the antenna, the feed to the antenna in the present application is implemented by the above defined structure. The feed in the present application is simple without extra loss and is robust too. The prior art GB2498431A only discloses providing a mechanical structure to connecting a shielding as a sleeve balun for the antenna, but does not disclose using that mechanical structure to implement feeding of the antenna.

The RF coupling is for example a galvanically isolated coupling, e.g. a capacitive, i.e. a dielectric coupling, or inductive coupling.

A capacitive coupling can for example also implement a high pass filter, for example which may perform (and replace) the function of a DC blocking capacitor.

Only a small size area of the circuit board is needed to form the second RF coupling portion, such as a small contact pad. This saves space compared to other components. The same advantage applies to the housing in forming the first RF coupling portion: there is no need for other circuit board coupling components, as the first RF coupling portion may again simply comprise a contact pad on the positioning member.

The device has easy assembly, and with easily achieved assembly consistency. The antenna structure can be a low cost conformal antenna (conforming to the housing shape) and also taking up little or no additional space. The antenna design has high reliability, since there is no problem of oxidation or aging and there is no need to check the contact quality.

The positioning member is for example made of plastic. It may be attached to the housing or preferably it may be integral with a plastic housing as one single part.

The circuit board may for example be a snap fit to the housing to secure a connection between them, and this snap fit connection is for separate to the positioning member. The positioning member thus serves to align the RF coupling portions, whereas the snap fit connection holds the circuit board in place.

The RF coupling is for example galvanically isolated, the first RF coupling portion comprises a first conductive pad electrode and the second RF coupling portion comprises a second conductive pad electrode, and the RF coupling comprises a capacitive coupling between the first and second conductive pad electrodes.

In another aspect of the invention, it is provided an electronic device comprising:

A housing having an internal surface;

a circuit board within the housing;

an RF circuit mounted on the circuit board;

an antenna structure formed on the housing;

a positioning member formed on the internal surface of the housing, and adapted to engage and position the circuit board;

a first RF coupling portion formed on the positioning member, and electrically connected to the antenna structure; and a second RF coupling portion formed on the circuit board and electrically connected to the RF circuit, wherein, when the circuit board is engaged and positioned by the positioning member, the second RF coupling portion is aligned with, and RF coupled to, the first RF coupling portion so as to provide a RF coupling between the antenna structure and the RF circuit, and the RF coupling is galvanically-isolated, the first RF coupling portion comprises a first conductive pad electrode and the second RF coupling portion comprises a second conductive pad electrode, and the RF coupling comprises a capacitive coupling between the first and second conductive pad electrodes.

As mentioned above, the capacitive coupling avoids the need for galvanic (i.e. Ohmic) electrical contact and it also provides a capacitor which can have a functional use in the circuit. The capacitive coupling forms part of the transmission line between the RF circuit and the antenna structure.

The capacitance of the capacitive coupling is for example larger than 1 pf, more preferably larger than 4 pf. This reduces a frequency shift caused by the series capacitance between the RF circuit and the antenna structure.

The positioning member for example comprises a holding structure adapted to accommodate and hold a portion of the circuit board thereby positioning the circuit board, wherein the first RF coupling portion is formed on the holding structure and the second RF coupling portion is formed on the portion of the circuit board.

Thus, the function of holding the circuit board also aligns the first and second RF coupling portions.

The holding structure for example comprises first and second spaced apart flanges projecting from the internal surface of the housing, adapted to clamp the circuit board between them. The flanges have inner walls that clamp around the circuit board.

The RF coupling is then across the first flange. Preferably the first RF coupling portion is on a sidewall of the first flange. Thus, the material of the first flange functions as the dielectric for a capacitive coupling between the first and second RF coupling portions.

In one example, the antenna structure is a single monopole antenna. This requires only a single RF coupling.

Alternatively, the antenna structure comprises a first antenna and a second antenna and the electronic device further comprises:

a third RF coupling portion on the second flange and electrically connected to the second antenna: and a fourth RF coupling portion formed on the circuit board, on an opposite side of the circuit board to the third RF coupling, and connected to the RF circuit, wherein, when the circuit board is engaged and positioned by the positioning member, the third RF coupling portion is aligned with, and RF coupled to, the fourth RF coupling portion so as to provide a further RF coupling between the second antenna and the RF circuit.

Thus, each of the two flanges has its own RF coupling portion for connection to the circuit board (in particular opposite sides of the circuit board). Thus, two RF couplings are formed for the two antennas.

The second and the fourth coupling portions are for example not overlapping on the opposite sides of the circuit board. Alternatively, the second and the fourth coupling portions are at least partially overlapping on the circuit board, wherein a distance between the second coupling portion and the first coupling portion and a distance between the fourth coupling portion and the third coupling portion are less than a distance between the second and the fourth coupling portions. In other words, the thickness of the circuit board should be larger than the thickness of the flanges.

This avoids a decrease in antenna transmission efficiency. When overlapping, the above defined distance is used for ensuring the outward RF coupling (i.e. between the first and second coupling portions and between the third and fourth coupling portions) dominates over the internal coupling (i.e. between the second and fourth coupling portions).

For case of the two antennas, the RF coupling may be a signal coupling and the further RF coupling may be a ground coupling. Alternatively, the RF coupling and the further RF coupling may both be signal couplings providing differential/balanced RF signals. This essentially implements a di-pole antenna.

A balanced transmission line may be provided between a) the first and third RF coupling portions and b) the antenna structure. This defines the feeding line to the antenna. It may be a parallel wire transmission line or any other dual-conductor transmission model. The transmission line can be used to tune the input impedance of the antenna by designing its characteristic impedance and electric length.

A desired insertion loss of the transmission line between the RF circuit and the antenna and a desired resonance frequency of the antenna may be designed by suitable design of the transmission line.

The circuit board for example comprises a microstrip parallel transmission line. This is the coupling between the RF circuit and the second and fourth RF coupling portions. It is designed to provide a low insertion loss to prevent power radiating to the air before the antenna.

The first and second antennas may be adapted to form a symmetrical di-pole antenna.

Note that the above-mentioned monopole antenna and di-pole antenna are just examples. Those skilled in the art understand that other types of antennas are also usable in devices such as bulbs, and same arrangements as described above may be used to provide the RF coupling between the antenna and the RF circuit. Thus the scope of the invention should not be limited as monopole antenna or di-pole antenna.

For all possible antenna configurations, the antenna structure may be formed as one or more strip antennas.

The antenna structure and the, or each, coupling portion formed on the positioning member may comprise:

a conductive material printed on the housing; or a metal sheet over molded on the housing; or a flexible PCB fixed on the housing.

Thus, there are various ways to implement the conductors needed.

The electronic device may comprise a lighting device, wherein the electronic device further comprises:

a light source; and a driver circuit for driving the light source, wherein the driving circuit is placed within the housing, wherein the driver circuit is also placed on said circuit board.

The invention may in this way be applied to a lighting device, such as a bulb.

The electronic device for example comprises a LED lighting device, wherein the housing comprises a base part and a light output face to which the light source output is directed, wherein the base part has a rim wherein it connects to the light output face, wherein the antenna is formed adjacent a portion of the rim.

The housing then for example has a cup shape. The positioning member is for example at the waist of the cup and a transmission line connection is made to the rim where the antenna is formed. This structure has an advantage of better RF radiation, because the antenna is no longer contained inside the cup but is level-shifted up to the outward rim of the cup which is less shielded by the luminaire in which the bulb is mounted.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
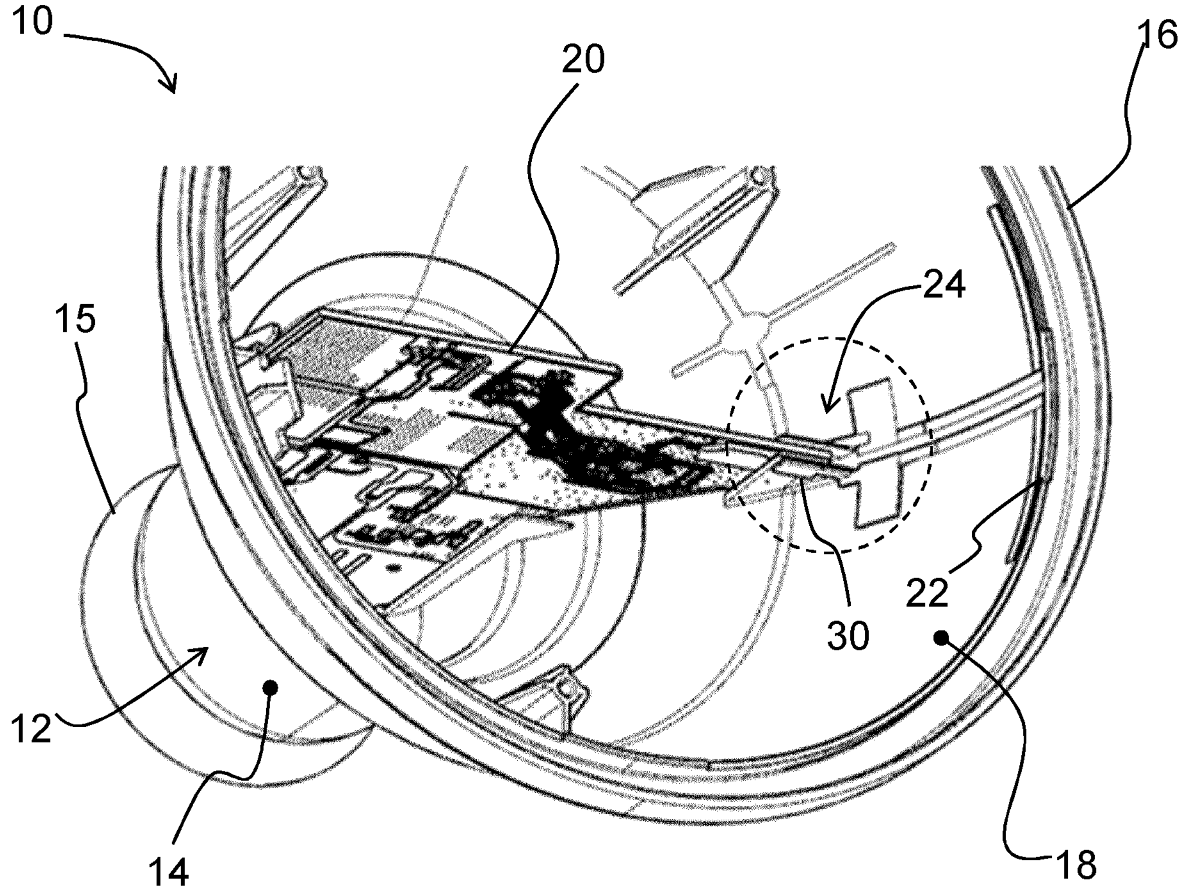
FIG. 1 shows a LED bulb.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an electronic device comprising a housing having an internal surface, a circuit board within the housing, an RF circuit mounted on the circuit board and an antenna formed on the housing. A positioning member is formed on the internal surface of the housing, and it engages and positions the circuit board. A first RF coupling portion is formed on the positioning member, and electrically connects to the antenna, and a second RF coupling portion is formed on the circuit board and electrically connects to the RF circuit. When the circuit board is fitted to the positioning member, the second RF coupling portion is aligned with, and RF coupled to, the first RF coupling portion so as to provide a RF coupling between the antenna and the RF circuit. Here RF coupled means the RF signal can be transferred, either in an electrical (non-galvanically isolated) way or in a galvanically isolated way, although the below embodiment will give more details on the galvanically isolated RF coupling.

The invention relates generally to any electronic device having a circuit board within a housing which needs to connect to an antenna which is separate to the circuit board, and in particular formed on the housing. The invention will be described with reference to a LED lighting device, in particular a LED bulb, having an antenna for enabling wireless remote control of the bulb by receiving wireless control commands. The antenna may also (or instead) be used for transmitting signals to a remote unit, for example for transmitting sensor data.

FIG. 1 shows the LED bulb 10. The bulb 10 has a housing 12 which defines the external shape of the bulb. The housing 12 has a base part 14 and a top part which defines a light output face. The light output face is not visible in FIG. 1, so that the internal parts of the bulb can be seen.

A LED arrangement is provided at the light output face, for example beneath a glass or plastic light output window. The LED arrangement is for example mounted on a separate printed circuit board covering the top end of the housing facing the light output direction. The separate printed circuit board with the LED arrangement are not shown.

The base 14 has a waist between a top end at a bottom end. An electrical connector 15 is at the bottom end, and a wide rim 16 is at the top end, which defines the shape of the light output face. The housing thus has a cup shape. In this example, the diameter of the housing becomes larger gradually from the bottom end to the top end. It could also be that the diameter is constant from the bottom end to the top end, such as the shape of a track light.

A circuit board 20 is mounted within the housing 12. An RF circuit is mounted on the circuit board, for enabling wireless communication. In particular, wireless control commands can be received by the bulb and/or wireless reporting data can be sent by the bulb. A lighting driver is also provided on the circuit board.

An antenna 22 is formed on the housing, in this example on an internal surface 18 of the housing. The antenna is in particular just beneath the rim 16 so that it is as far as possible from the bulb connector 15 and the components on the circuit board 20, thereby to minimize interference.

The antenna may be a single-ended antenna or a differential antenna, or a dipole antenna arrangement (which two radiating antenna portions). A microstrip parallel transmission line structure is for example provided on the circuit board achieve low insertion loss. The circuit board can also include an RF balun for a single-ended antenna, or circuitry for balanced signal conversion, according to the application needs.

There is preferably also a balanced transmission line integrated with the antenna which can be designed to match the impedance of the antenna by designing the characteristic impedance and length. The antenna (and transmission line leading to the antenna) can be formed by metal printing, or over-molding a metal sheet over the housing or fixing a flexible PCB to the housing.

Instead of a microstrip parallel transmission line, another dual-conductor transmission model may be used.

The circuit board 20 is held in position by a positioning member 24 formed on the internal surface of the housing. This positioning member 24 engages and positions the circuit board. Preferably, the positioning member 24 is at the waist of the housing, so near the middle or near the bottom end of the bulb.

The positioning member is for example plastic. It may be an integral part of a plastic housing or it may be attached to a housing of a different material such as glass. The positioning member is for example in the form of a board-fixing buckle.

The positioning member 24 also has the function of implementing an RF connection between the circuit board 20 and the antenna 24. For this purpose, there is a first RF coupling portion 30, such as an electrical conductor pad, formed on the positioning member 24, and this coupling portion 30 electrically connects to the antenna. There is a second RF coupling portion, such as an electrical conductor pad, formed on the circuit board which electrically connects to the RF circuit carried by the circuit board 20. The second RF coupling portion is not visible in FIG. 1.

By fitting the circuit board 20 to the positioning member 24, the second RF coupling portion of the RF circuit is aligned with, and RF coupled to, the first RF coupling portion 30 so as to provide a RF coupling between the antenna and the RF circuit. There may for example be a snap fit to hold the circuit board in a fixed position relative to the housing, for example an additional coupling between the circuit board and the housing at the bottom of the board. This snap fit ensures the vertical position of the board for example with a tolerance of 0.1 mm. Thus, the RF coupling portions on the circuit board and on the positioning member can be aligned with very small tolerance. The positioning member is for example a passive positioning with no active holding of the circuit board.

A transmission line connection is made from the positioning member to the rim 16 where the antenna 22 is formed.

Preferably the RF coupling is a dielectric coupling, so that there is capacitive or inductive coupling between the RF coupling portions, rather than a low resistance electrical coupling. Thus, there is a galvanic isolated coupling between the RF coupling portions. This means no soldering or mechanical spring contacts are needed. The RF coupling is made simply by fitting the circuit board 20 to the positioning member 24 at the inner surface of the housing. A coupling which is not galvanically isolated, e.g. a low resistance electrical coupling, is also possible.

A capacitive RF coupling can for example also implement a high pass filter, for example which may perform (and replace) the function of a DC blocking capacitor. The capacitance formed by the RF coupling is for example larger than 1 pf, more preferably larger than 4 pf.

The RF coupling can be made with small contact pads, thus taking up a small amount of space. The antenna 22 can be a low cost conformal antenna (conforming to the housing shape) and also taking up almost no additional space. The antenna design has high reliability, since there is no problem of oxidation or aging and there is no need to check the contact quality.

The bulb can be assembled simply and with easily achieved assembly consistency.

Figure 2:
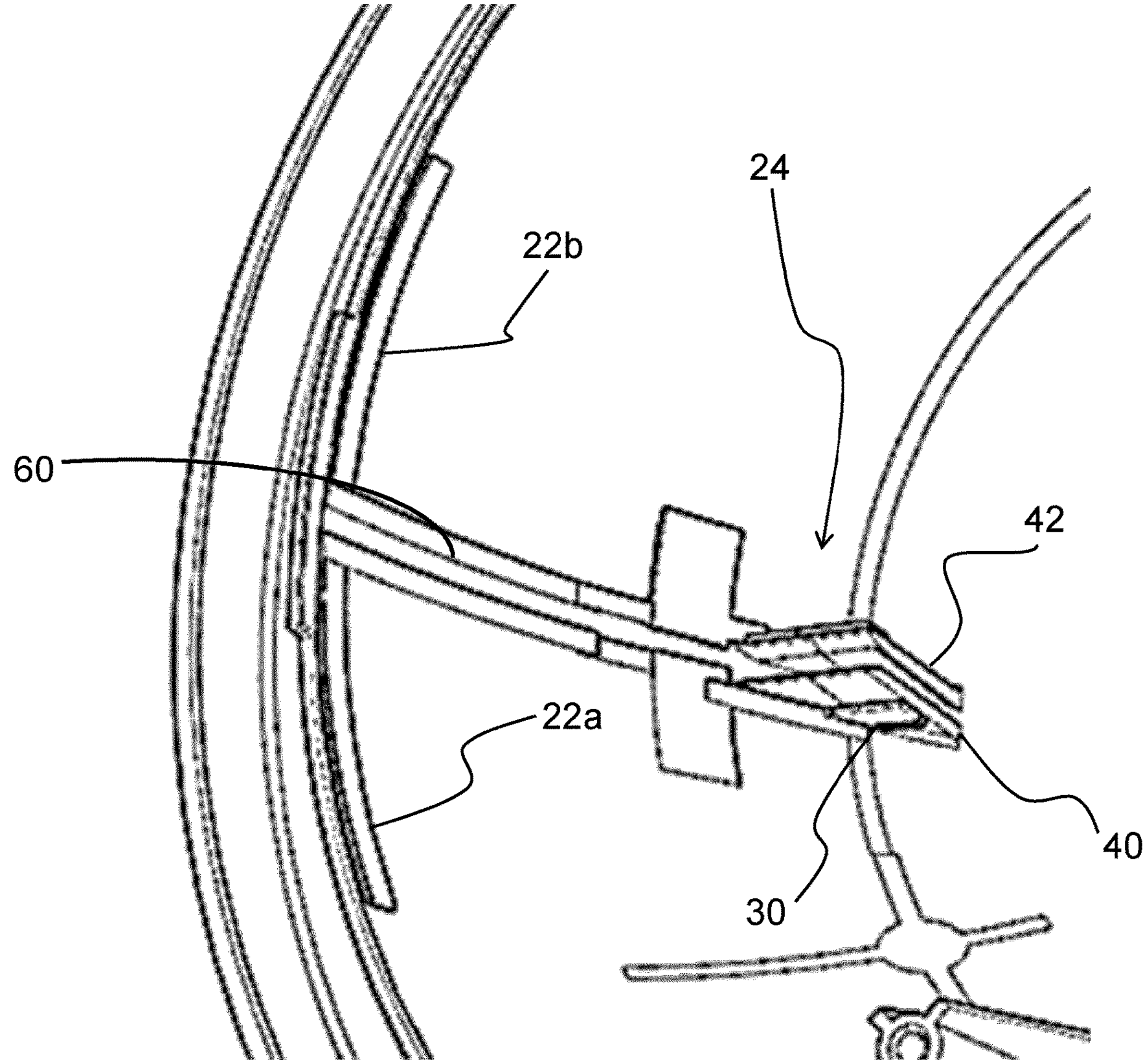
FIG. 2 shows the housing of the LED bulb with the circuit board removed.

FIG. 2 shows in an enlarged view the housing, with the circuit board removed, to show the positioning member 24 more clearly.

The positioning member 24 comprises a first flange 40 and a second flange 42 spaced apart from each other, projecting inwardly from the internal surface of the housing, An edge of the circuit board is received in the space between the flanges. The flanges are thus one possible example of a holding structure for clamping the circuit board. Please note other positioning structures, such as a snap fit coupling, are also possible and fall into the scope of the invention.

In this particular, example, the flanges 40, 42 have inner faces that clamp the circuit board. The first RF coupling 30 is provided on an opposite outer face of the first flange 40. Thus, the insulating material of the first flange acts as the dielectric between the first RF coupling portion 30 and the corresponding second RF coupling portion of the circuit board. Thus, the function of holding the circuit board also aligns the first and second RF coupling portions.

The flange thickness and material determines the coupling capacitance and this is designed to achieve a desired trade-off between the coupling capacitance and structural strength.

The antenna for example comprises a dipole antenna, which may be considered to comprise a first antenna 22*a* and a second antenna 22*b* mounted on the housing. Two RF couplings are then provided between the RF circuit and the second antenna.

For this purpose, a third RF coupling portion is provided on the second flange 42 and electrically connected to the second antenna 22*b* and a fourth RF coupling portion formed on the circuit board. This fourth RF coupling is then on opposite side of the circuit board to the third RF coupling, but also connected to the RF circuit. When the circuit board is engaged and positioned by the positioning member 24, RF couplings are provided across both flanges 40, 42. The third RF coupling portion is aligned with, and RF coupled to, the fourth RF coupling portion so as to provide the second RF coupling between the further antenna and the RF circuit.

The first/third RF coupling portions may for example be for an RF signal and the second/fourth RF coupling portions may be for a ground connection. The first and third coupling portions (of the positioning member) terminate the parallel wire transmission line which is integrally formed with the antenna.

The coupling portions on the positioning member (and the metal parts on the housing) can for example be positioned with a tolerance of +/−0.1 mm, whereas the metal lines on the circuit board for example have a tolerance of +/−0.05 mm. The first and second RF coupling portions preferably have the same size and shape and the third and fourth RF coupling portions preferably also have the same size and shape.

The second and the fourth coupling portions are for example not overlapping on the circuit board, i.e. they are at different spatial positions on the opposite sides of the circuit board. This reduces signal interferences and hence avoids a reduction in transmission efficiency. However, it means a larger positioning member is needed, since contact pads are needed at different spatial locations on the flanges.

Alternatively, the second and the fourth coupling portions may at least partially overlap on the opposite sides of the circuit board. This reduces the needed size of the positioning member. However, a distance between the second coupling portion and the first coupling portion and a distance between the fourth coupling portion and the third coupling portion are less than a distance between the second and the fourth coupling portions. Thus, there is better alignment between the contact pads which are to be RF coupled together, than the alignment between the pads on the opposite sides of the circuit board. This ensures the outward RF coupling (i.e. between the first and second coupling portions and between the third and fourth coupling portions) dominates over the internal coupling (i.e. between the second and fourth coupling portions).

The RF coupling may be a signal coupling and the further RF coupling may be a ground coupling e.g. for a monopole antenna. Alternatively, the RF coupling and the further RF coupling may both be signal couplings coupled to differential/balanced RF signals.

Indeed, the design may be applied to any desired antenna structure.

Figure 3:
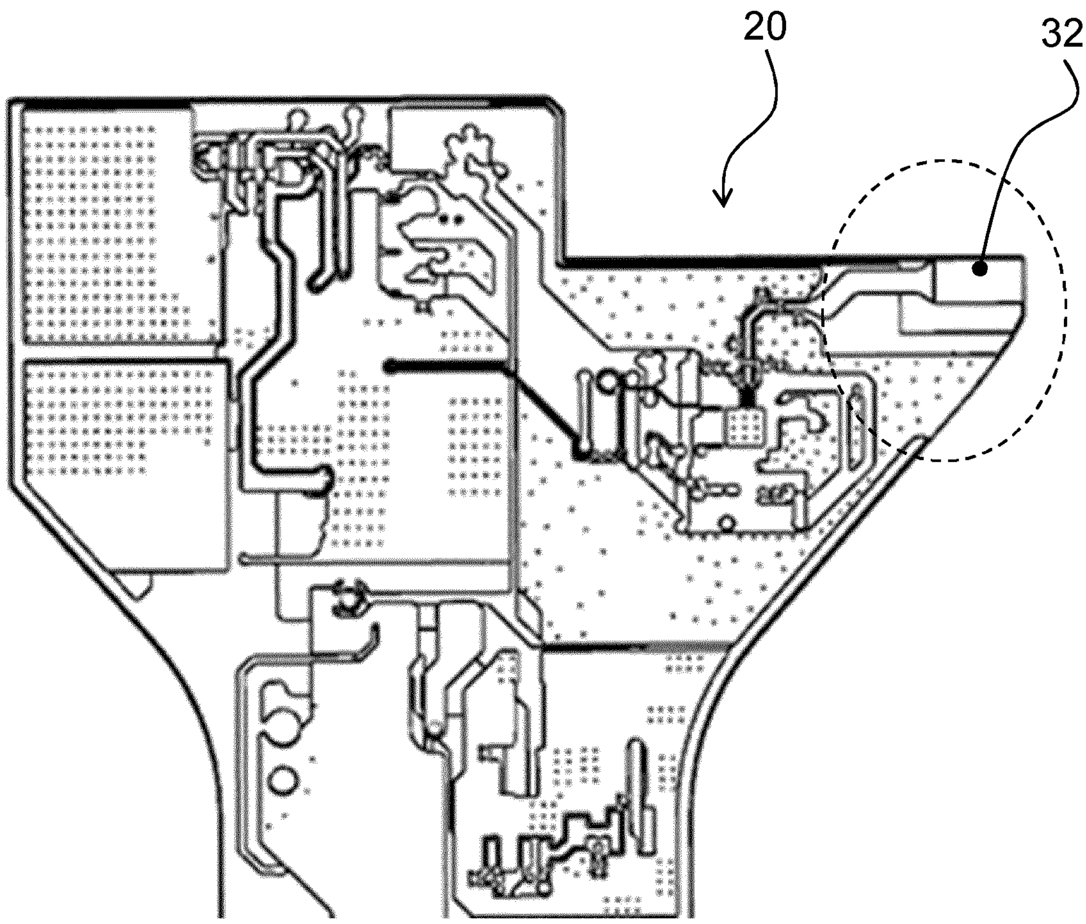
FIG. 3 shows a first side of the circuit board.

FIG. 3 shows a first side of the circuit board 20 and shows the second RF coupling portion 32, which is for a RF signal.

Figure 4:
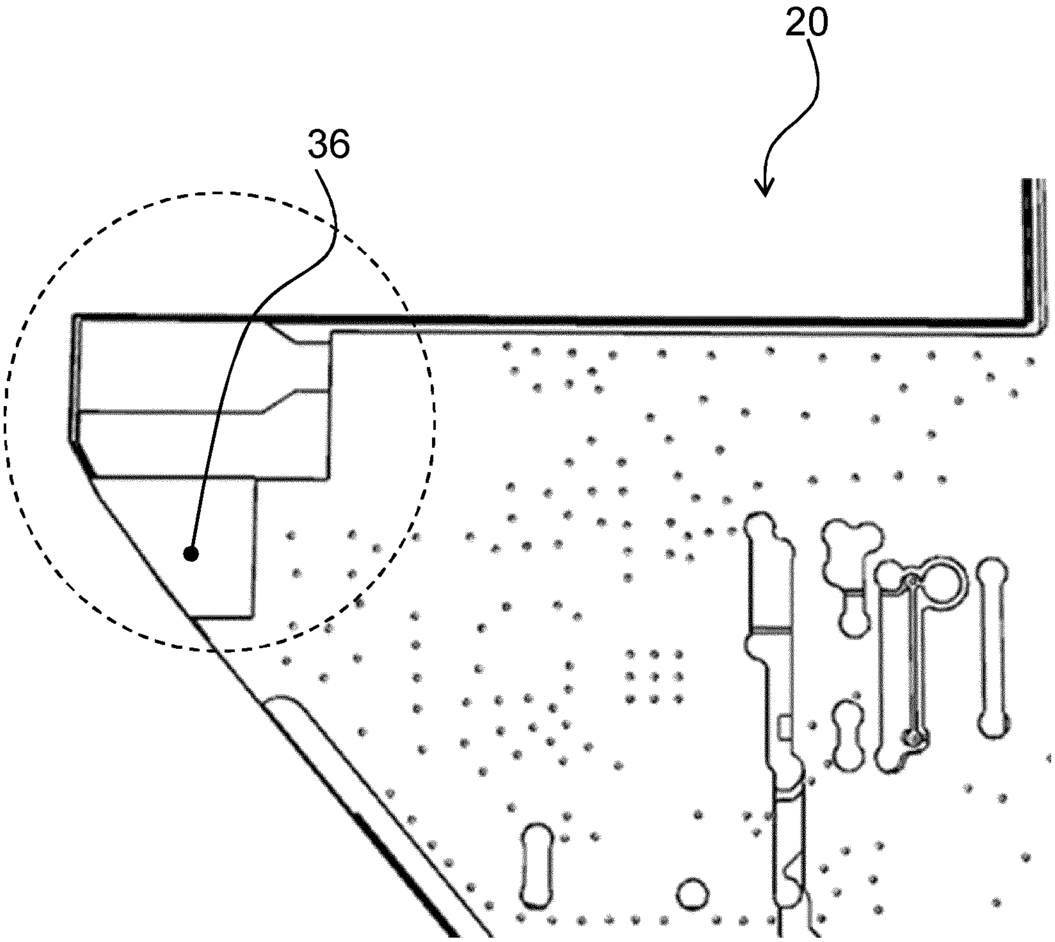
FIG. 4 shows a second side of the circuit board.

FIG. 4 shows a second side of the circuit board 20 and shows the fourth RF coupling portion 36, which is in one example is for a ground signal.

The fourth RF coupling portion 36 and the second RF coupling portion 32 can be on the same side/layer of the circuit board so that a low-cost single layer PCB can be used, or they can be on opposite sides or in different layers of the circuit board. If the two coupling portions are at least partially overlapping, they have to be on the opposite sides or in different layers of the circuit board.

The coupling portions 32 and 36 can be part of a transmission line for preventing power being radiated power to the air. Thus, a transmission line is provided from the RF circuit to the antenna.

Figure 5:
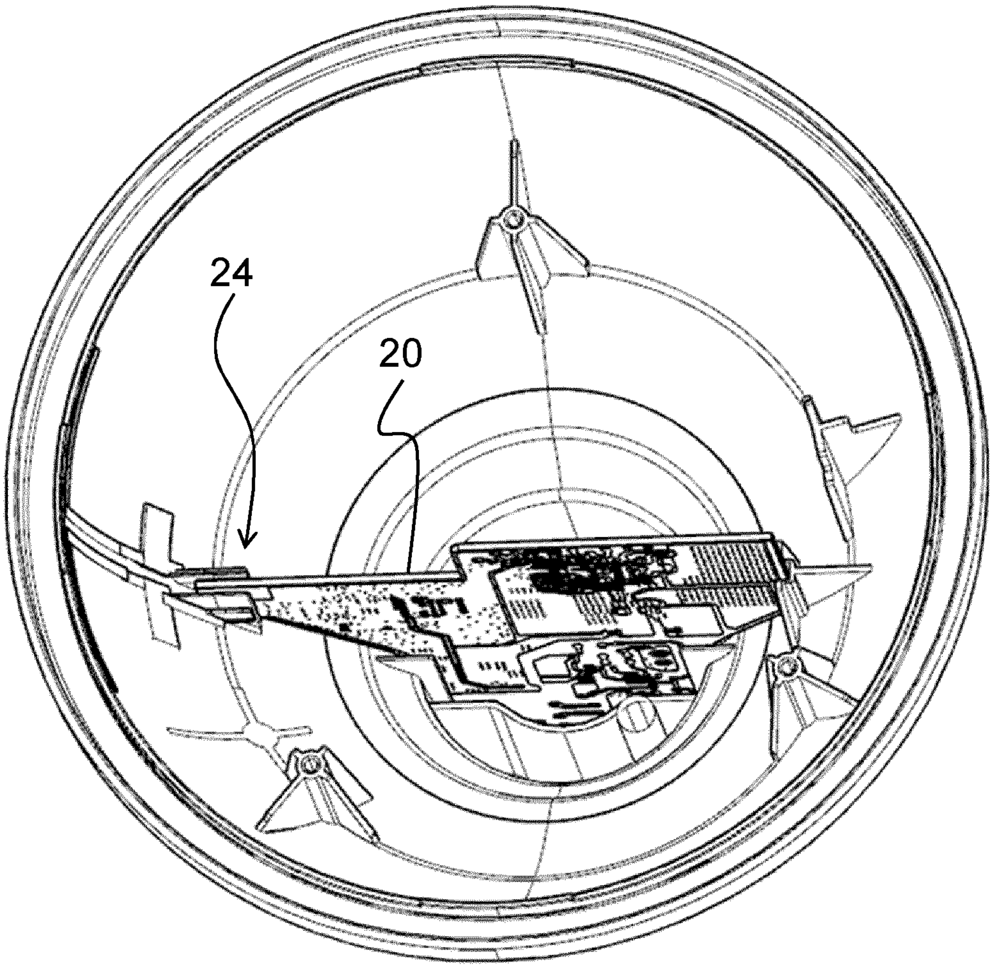
FIG. 5 shows another view of the inside of the housing.

FIG. 5 shows another view of the inside of the housing.

Figure 6:
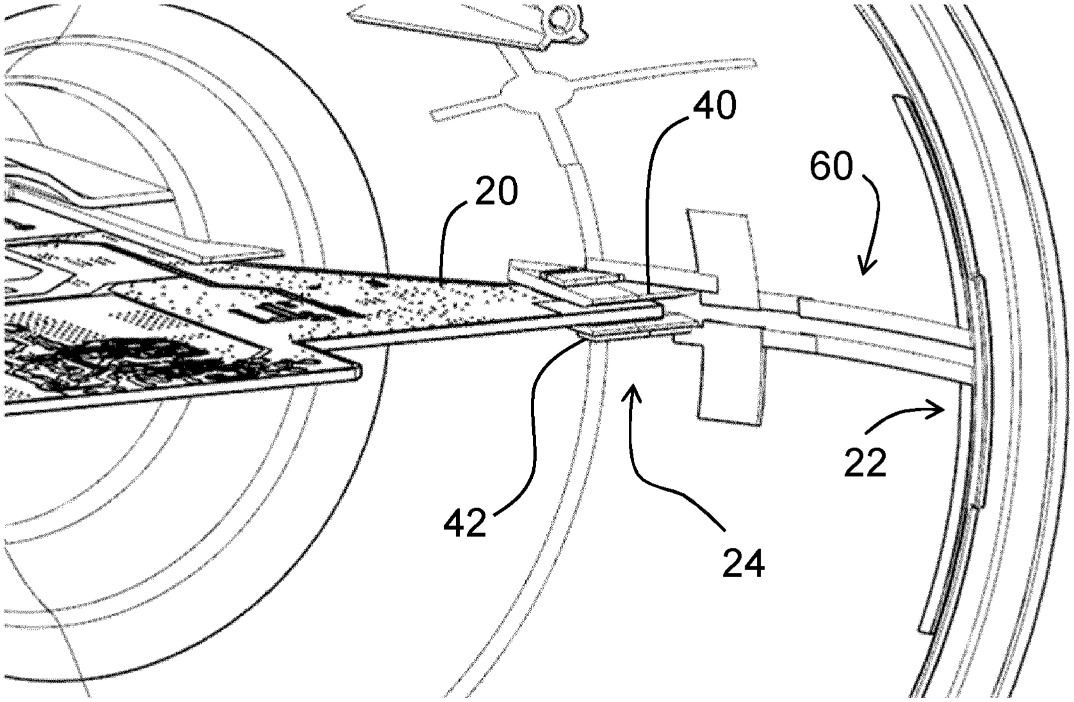
FIG. 6 shows the positioning member more clearly with the circuit board in position.

FIG. 6 shows the positioning member 24 more clearly with the circuit board positioned between the flanges 40, 42.

FIG. 6 also shows the balanced transmission line 60 provided between the first and third RF coupling portions (on the positioning member 24) and the antenna 22 (with two antenna portions). This example shows a parallel wire transmission line as the coupling to the antenna, by which power is delivered to the antenna.

This makes the design metrics very simple. By using the S21 insertion loss metric, an S parameter can be used to evaluate the performance. The transmission line 60 will not affect the original parameters of the antenna, and only when it is considered as a part of the feed of the antenna, the feed efficiency will be affected. As a result, the antenna gain will be affected. However, the inherent frequency and directivity pattern of the antenna will not be affected.

The S21 insertion loss is for example less than 1.5 dB.

The size of the RF coupling portions can affect the S11 return loss parameter of the transmission line structure. The resonant frequency of the transmission line from the circuit board to the antenna will shift (e.g. when the source impedance is 50 Ohms), in a similar manner to an LC impedance matching circuit. This affects the minimum reflected feed frequency rather than the resonance frequency of the antenna.

A parasitic effect will result from any change of the pad size (due to positioning error), as a result of a change in the series capacitance. A frequency shift caused by this effect can be ignored as long as this capacitance is larger than a threshold, such as 1 pF, or more preferably 4 pF (as also mentioned above). However, as a result of the limited space for the coupling, 1 pF to 4 pF is acceptable as the impedance can be tuned by a matching network by keeping a large pad size (e.g. corresponding to more than 8 pF).

The pad size, clearance area, and width of the parallel transmission line 60 are the main design parameters that will affect the input impedance and resonant frequency. A simple parallel plate capacitor model can be used to estimate the impact of the capacitance.

The dielectric permittivity for that capacitance depends on the material of the positioning member, the area depends on the RF coupling portion sizes and the distance depends on the thickness flanges. The properties of the RF coupling portions on the circuit board (e.g. copper pads on the circuit board) such as the pad size and clearance between the pad and ground will also affect the impedance and resonance frequency. Similarly, the properties of the RF coupling portions on the positioning member (e.g. metal printed or molded on the positioning member) will also affect the impedance and resonance frequency.

Figure 7:
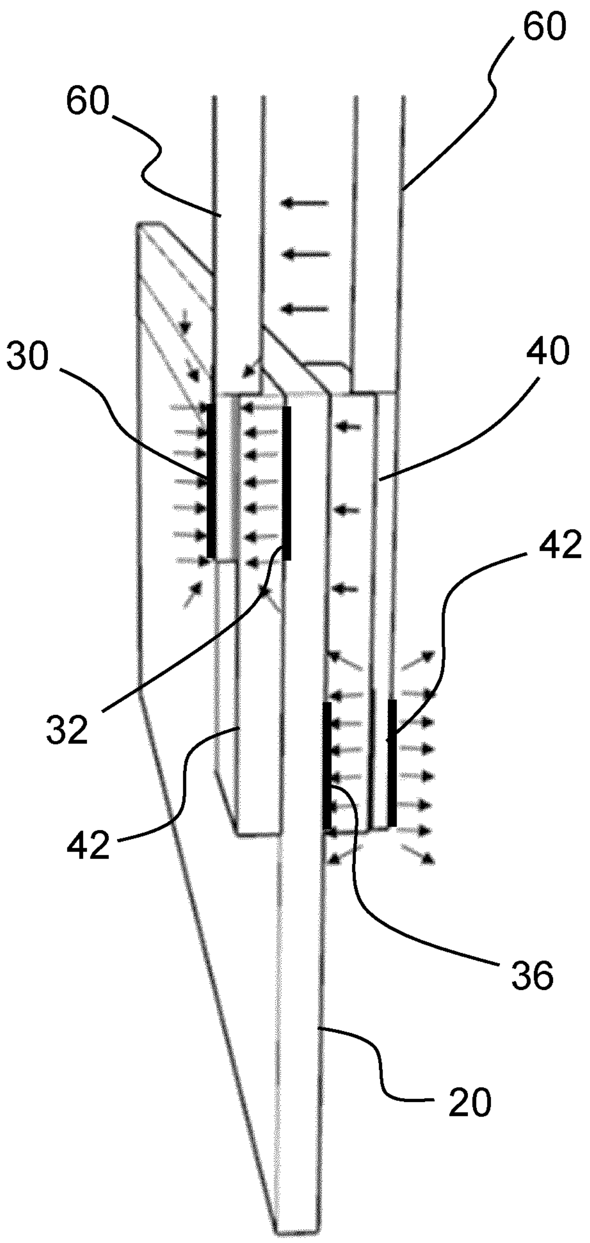
FIG. 7 shows the circuit board in position and shows electric field lines.

FIG. 7 shows the circuit board 20 between the flanges 40, 42 and shows electric field lines between the first and second RF coupling portions 30,32 and between the third and fourth RF coupling portions 34,36. The orientation in FIG. 7 is the same as that in FIGS. 3 and 4, wherein the second RF coupling portion 32 is at an upper portion on the circuit board and the fourth RF coupling portion 36 is at a lower portion on the circuit board. It shows the first and third RF coupling portions in a non-overlapping positional relationship. The electric field is predominantly at the coupling areas and to the transmission line structure 60.

Figure 8:
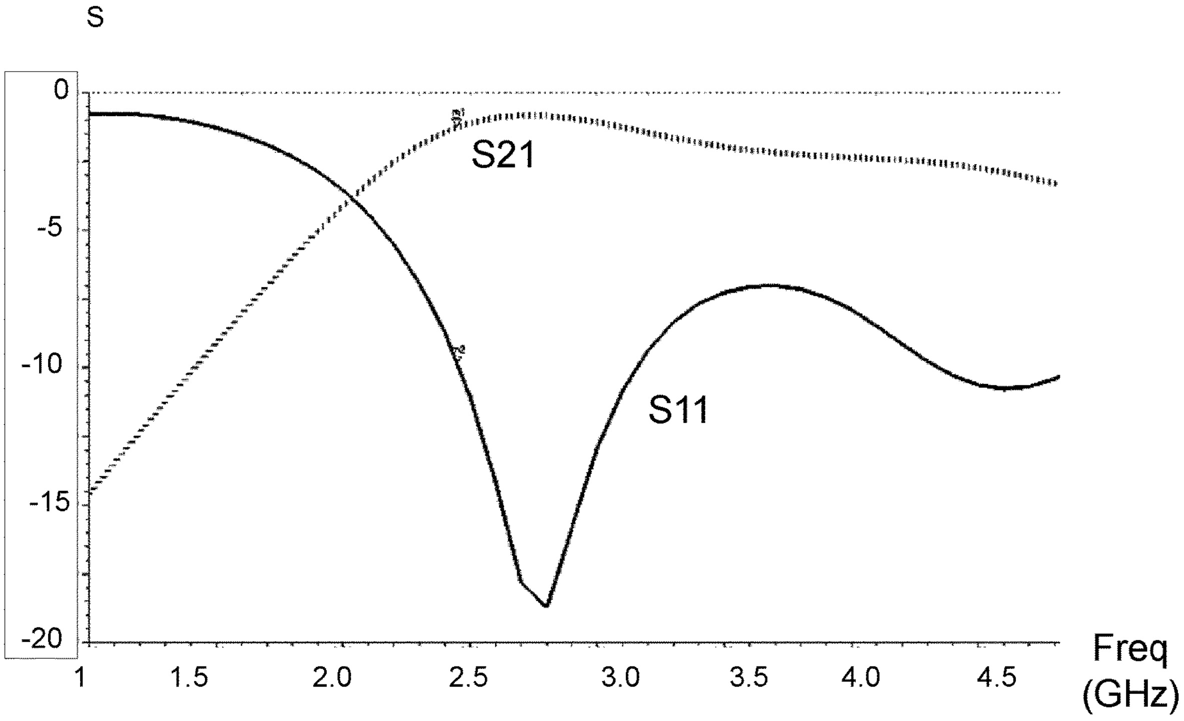
FIG. 8 shows an example of the S11 and S21 coupling parameters.

FIG. 8 shows an example of the S11 and S21 coupling parameters. The insertion loss is low and the return loss is also good. The resonant frequency shifts as a result of the series capacitances but this can be easily corrected by matching.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A LED lighting device comprising:

a housing having an internal surface, said housing having a cup shape with a bottom end, a top end including a light output face, and a waist between the bottom end and the top end;

a circuit board within the housing;

an RF (radio frequency) circuit mounted on the circuit board;

an antenna structure formed on the housing;

a positioning member formed on the internal surface of the housing and at the waist of the cup shape, and adapted to engage and position the circuit board;

a first RF coupling portion formed on the positioning member, and electrically connected to the antenna structure; and a second RF coupling portion formed on the circuit board and electrically connected to the RF circuit, wherein, when the circuit board is engaged and positioned by the positioning member, the second RF coupling portion is aligned with, and RF coupled to, the first RF coupling portion so as to provide a RF coupling between the antenna structure and the RF circuit, characterized in that said first RF coupling portion is adapted to provide the RF coupling as the feed of the antenna structure.

2. The electronic device of claim 1, wherein the RF coupling is galvanically-isolated, the first RF coupling portion comprises a first conductive pad electrode and the second RF coupling portion comprises a second conductive pad electrode, and the RF coupling comprises a capacitive coupling between the first and second conductive pad electrodes, wherein preferably the capacitance of the capacitive coupling is larger than 1 pf, more preferably larger than 4 pf.

3. The electronic device of claim 1, wherein the positioning member comprises a holding structure adapted to accommodate and hold a portion of the circuit board thereby positioning the circuit board, wherein the first RF coupling portion is formed on the holding structure and the second RF coupling portion is formed on the portion.

4. The electronic device of claim 3, wherein the holding structure comprises a first and second spaced apart flanges projecting from the internal surface of the housing, adapted to clamp the circuit board between them.

5. The electronic device of claim 4, wherein the RF coupling is across the first flange, preferably the first RF coupling portion is on a sidewall of the first flange.

6. The electronic device of claim 5, wherein:

the antenna structure is a single monopole antenna; or the antenna structure comprises a first antenna and a second antenna formed on the housing and the electronic device further comprises:

a third RF coupling portion on the second flange and electrically connected to the second antenna; and a fourth RF coupling portion formed on the circuit board, on an opposite side of the circuit board to the third RF coupling, and connected to the RF circuit, wherein, when the circuit board is engaged and positioned by the positioning member, the third RF coupling portion is aligned with, and RF coupled to, the fourth RF coupling portion so as to provide a further RF coupling between the second antenna and the RF circuit.

7. The electronic device of claim 6, wherein the RF coupling and further RF coupling portions are at opposite sides of the circuit board, and:

the second and the fourth coupling portions are not overlapping on the circuit board; or the second and the fourth coupling portions are at least partially overlapping on the circuit board, wherein a distance between the second coupling portion and the first coupling portion and a distance between the fourth coupling portion and the third coupling portion are less than a distance between the second and the fourth coupling portions.

8. The device of claim 6, wherein:

the RF coupling is a signal coupling and the further RF coupling is a ground coupling; or the RF coupling and the further RF coupling are both signal couplings coupled to differential/balanced RF signals.

9. The electronic device of claim 6, comprising a balanced transmission line between a) the first and third RF coupling portions and b) the antenna structure.

10. The electronic device of claim 6, wherein the circuit board comprises a microstrip parallel transmission line.

11. The electronic device of claim 6 wherein the first antenna and the second antenna are adapted to form a symmetrical di-pole antenna.

12. The electronic device of claim 1, wherein the antenna structure comprises a strip antenna structure.

13. The electronic device of claim 1, wherein the antenna structure and the, or each, coupling portion formed on the positioning member comprise:

a conductive material printed on the housing; or a metal sheet over molded on the housing; or a flexible PCB fixed on the housing.

14. The electronic device of claim 13, wherein the light source comprises a LED, the housing comprises a bottom end and a top end including a light output face to which the light source output is directed, wherein the top end has an opening to form the light output face, wherein the opening has a rim and the antenna structure is formed adjacent a portion of the rim.

15. The electronic device of claim 1 comprising a lighting device, wherein the lighting device further comprises:

a light source; and a driver circuit for driving the light source, wherein the driving circuit is placed within the housing, wherein the driver circuit is also placed on said circuit board.

16. An electronic device comprising:

a housing having an internal surface;

a circuit board within the housing;

an RF (radio frequency) circuit mounted on the circuit board;

an antenna structure formed on the housing;

a positioning member formed on the internal surface of the housing, and adapted to engage and position the circuit board;

a first RF coupling portion formed on the positioning member, and electrically connected to the antenna structure; and a second RF coupling portion formed on the circuit board and electrically connected to the RF circuit, wherein, when the circuit board is engaged and positioned by the positioning member, the second RF coupling portion is aligned with, and RF coupled to, the first RF coupling portion so as to provide a RF coupling between the antenna structure and the RF circuit, and the RF coupling is galvanically-isolated, the first RF coupling portion comprises a first conductive pad electrode and the second RF coupling portion comprises a second conductive pad electrode, and the RF coupling comprises a capacitive coupling between the first and second conductive pad electrodes.

* * * * *